(No Model.)
I. R. NEWKIRK.
TIRE FOR WHEELS.
No. 467,015. Patented Jan. 12, 1892.
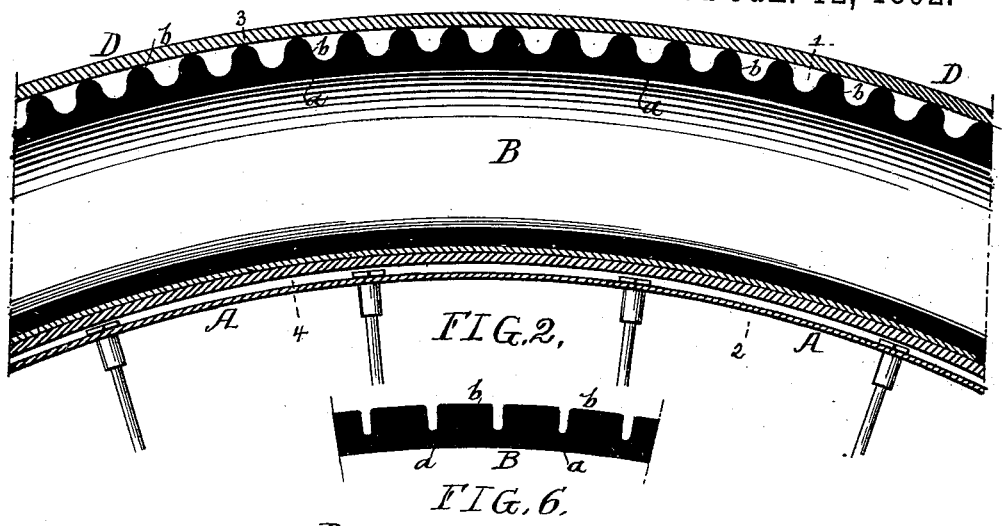
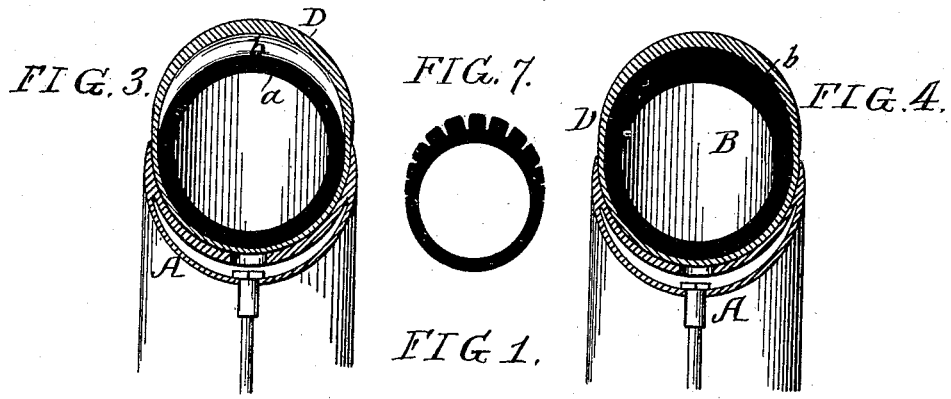
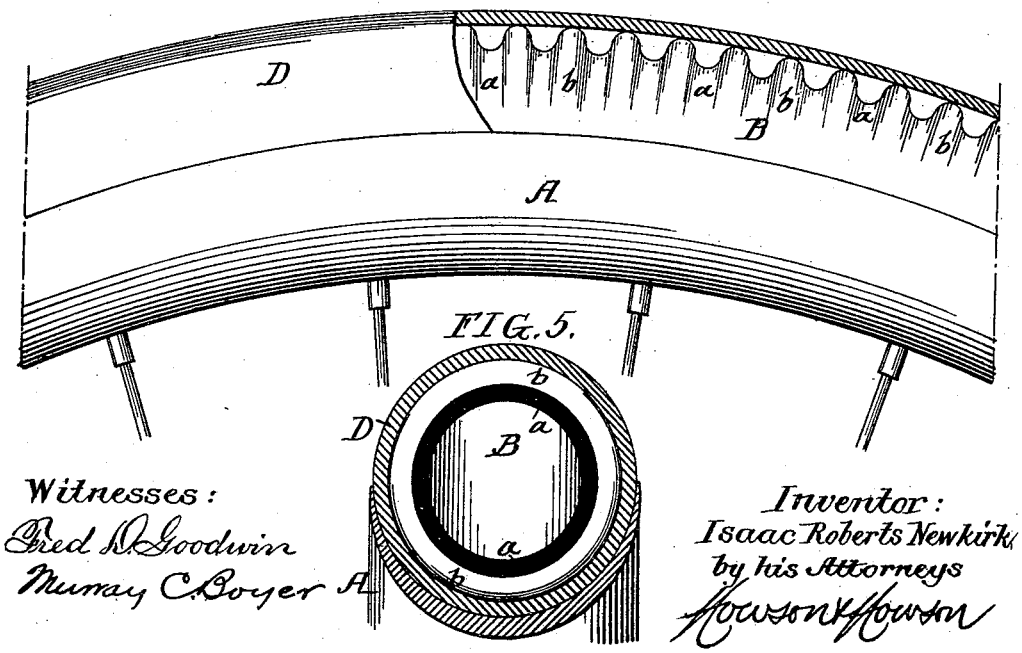
Witnesses:
Fred D. Goodwin
Murray C. Boyer
Inventor:
Isaac Roberts Newkirk
by his Attorneys
Howson & Howson

UNITED STATES PATENT OFFICE.

ISAAC ROBERTS NEWKIRK, OF PHILADELPHIA, PENNSYLVANIA.

TIRE FOR WHEELS.

SPECIFICATION forming part of Letters Patent No. 467,015, dated January 12, 1892.

Application filed August 14, 1891. Serial No. 402,599. (No model.)

*To all whom it may concern:*

Be it known that I, ISAAC ROBERTS NEWKIRK, a citizen of the United States, and a resident of Philadelphia, Pennsylvania, have invented certain Improvements in Tires for Wheels, of which the following is a specification.

The object of my invention is to form a cushioned or inflated bicycle-tire which will not so readily cut out as tires heretofore made, and this object I attain in the following manner, reference being had to the accompanying drawings, in which—

Figure 1 is a side view of sufficient of a bicycle-wheel to illustrate my invention, the cover of the tire being partially removed. Fig. 2 is a longitudinal sectional view. Fig. 3 is a transverse section on the line 1 2, Fig. 2. Fig. 4 is a transverse section on the line 3 4, Fig. 2; and Figs. 5, 6, and 7 are sectional views of modifications of my invention.

The great objection to a pneumatic or to a cushioned tire is the liability of cutting through the tube, thereby forming an opening for the escape of air and destroying the elasticity of the tire. If a tube is made thick enough to prevent a stone from cutting through it, its elasticity is unduly decreased; but by making a tube in the manner which I will now proceed to describe I am enabled to make it elastic and at the same time substantial enough to withstand any ordinary cutting action.

Referring to the drawings, A is the felly, made in any suitable manner, and seated in this felly is the tire B, which is tubular in form, is made of rubber or other suitable material, and has a series of transverse ribs $b$ on its bearing-face, as shown in Figs. 1 and 3, these ribs being only at the bearing-face and the tire having a plain back, which rests in the felly. The portion $a$ between the ribs $b$ is comparatively thin, so as to make the tire elastic, and the ribs are of such depth and of such a distance apart as to prevent a stone from cutting into the thin portions $a$ of the tire. The ribs and recesses are preferably arranged as shown; but other forms of ribs may be made without departing from my invention.

I preferably surround the tire B with a casing D of any suitable material, either canvas, rubber, or the like, which will withstand wear, and this casing may be thicker at the face than at the rear, as shown in Fig. 3, or it may be of the same thickness throughout, as shown in Fig. 5, the casing being secured to the felly in any suitable manner.

In some instances, instead of the ribs being only at the wearing-surfaces of the tire, they may be annular ribs, as shown in Fig. 5, and the tire need not necessarily be in the form of a tube, as it may be U-shaped, having its edges secured to the felly in any suitable manner, the shape and character of the tire depending greatly upon the make of the bicycle or other vehicle to which it is applied.

The covering over the ribbed face of the tire protects the tire to a certain extent and imparts a desirable finish to the wheel.

In Fig. 6 I have shown a tire in which the ribs have broad faces, and the spaces between the ribs are narrow, and in this instance a very light casing may be used; or the casing may be dispensed with, as the ribs are so close together as to form a comparatively uniform bearing surface, the spaces between the ribs being of such a width, however, as to impart the desired elasticity to the tire.

The tire may, if desired, have longitudinal ribs arranged closely together, as in Fig. 7.

I claim as my invention—

1. A hollow flexible tire for vehicles, consisting of a tube having on its bearing-face ribs formed integral therewith, substantially as described.

2. A hollow flexible tire for vehicles, consisting of a tube having on its bearing-face transverse ribs formed integral therewith, substantially as set forth.

3. A hollow tire for bicycles, having its bearing-face composed of a series of thick ribs formed on a hollow section, the portion of the tire between the ribs being thin to allow the tire to yield, with an outer casing inclosing the ribbed portion, substantially as described.

4. A tire for bicycle or other wheels, having a tubular portion which can be inflated and which has a series of ribs on its exterior surface, with an outer cover inclosing the tubular portion and by which the tubular portion is secured to the felly of the wheel, substantially as described.

5. The combination, in a tire for bicycle or other wheels, of the tubular portion B, having transverse ribs $b$ extending across its bearing portion only, with a casing D surrounding the tubular portion B, said casing being secured to the felly of the wheel, substantially as described.

In testimony whereof I have signed my name to this specification in the presence of two subscribing witnesses.

ISAAC ROBERTS NEWKIRK.

Witnesses:
EUGENE ELTERICH,
HARRY SMITH.